US009524147B2

(12) United States Patent
Erlewein et al.

(10) Patent No.: US 9,524,147 B2
(45) Date of Patent: Dec. 20, 2016

(54) ENTITY-BASED CROSS-APPLICATION NAVIGATION

(71) Applicants: Thorsten Erlewein, Karlsruhe (DE);
Martin Zurmuehl, Muehlhausen (DE);
Markus Cherdron, Muehlhausen (DE)

(72) Inventors: Thorsten Erlewein, Karlsruhe (DE);
Martin Zurmuehl, Muehlhausen (DE);
Markus Cherdron, Muehlhausen (DE)

(73) Assignee: SAP SE, Walldorf (DE)

( * ) Notice: Subject to any disclaimer, the term of this patent is extended or adjusted under 35 U.S.C. 154(b) by 135 days.

(21) Appl. No.: 13/941,078

(22) Filed: Jul. 12, 2013

(65) Prior Publication Data

US 2014/0337815 A1 Nov. 13, 2014

Related U.S. Application Data

(60) Provisional application No. 61/822,163, filed on May 10, 2013.

(51) Int. Cl.
| | |
|---|---|
| *G06F 9/44* | (2006.01) |
| *G06F 9/445* | (2006.01) |
| *G06F 9/54* | (2006.01) |
| *G06F 17/30* | (2006.01) |
| *G06F 9/455* | (2006.01) |

(52) U.S. Cl.
CPC .............. *G06F 8/30* (2013.01); *G06F 9/445* (2013.01); *G06F 17/30* (2013.01); *G06F 9/45516* (2013.01); *G06F 9/54* (2013.01)

(58) Field of Classification Search
CPC .......... G06F 8/30; G06F 9/45516; G06F 9/54; G06F 9/445; G06F 17/30
See application file for complete search history.

(56) References Cited

U.S. PATENT DOCUMENTS

| | | | |
|---|---|---|---|
| 6,338,097 B1 | 1/2002 | Krenzke et al. | |
| 6,560,656 B1* | 5/2003 | O'Sullivan | G06F 9/4416 709/220 |
| 6,952,620 B2 | 10/2005 | Cherdron et al. | |
| 6,957,427 B1* | 10/2005 | Wollrath | G06F 9/548 718/1 |
| 7,200,804 B1 | 4/2007 | Khavari et al. | |

(Continued)

OTHER PUBLICATIONS

Hall, C. A., Web presentation layer bootstrapping for accessibility and performance, Proceedings of the 2009 International Cross-Disciplinary Conference on Web Accessibililty (W4A), 2009, pp. 67-74, [retrieved on Aug. 17, 2016], Retrieved from the Internet: <URL:http://dl.acm.org/>.*

(Continued)

*Primary Examiner* — Geoffrey St Leger
(74) *Attorney, Agent, or Firm* — Fish & Richardson P.C.

(57) ABSTRACT

The present disclosure describes methods, systems, and computer program products for providing entity-based, cross-application navigation according to an implementation. One computer-implemented method includes receiving a request for data and callable entities associated with a provided entity context, transmitting the data and callable entities, receiving request for bootstrap code associated with a target application, generating bootstrap code containing an application environment runtime detection library and application environment navigation data, and transmitting the bootstrap code.

24 Claims, 6 Drawing Sheets

(56) References Cited

U.S. PATENT DOCUMENTS

| | | | |
|---|---|---|---|
| 7,212,212 B2 | 5/2007 | Cherdron | |
| 7,225,424 B2 | 5/2007 | Cherdron et al. | |
| 7,340,679 B2 | 3/2008 | Botscheck et al. | |
| 7,409,692 B2 | 8/2008 | Ittel et al. | |
| 7,543,268 B2 | 6/2009 | Cherdron et al. | |
| 7,581,204 B2 | 8/2009 | Reeder et al. | |
| 7,596,620 B1 * | 9/2009 | Colton et al. | 709/226 |
| 7,600,215 B2 | 10/2009 | Cherdron et al. | |
| 7,664,860 B2 | 2/2010 | Beck et al. | |
| 7,711,694 B2 | 5/2010 | Moore | |
| 7,734,560 B2 | 6/2010 | Seeger et al. | |
| 7,757,208 B2 | 7/2010 | Degenkolb et al. | |
| 7,765,255 B2 | 7/2010 | Cherdron et al. | |
| 7,769,698 B2 | 8/2010 | Matic | |
| 7,769,821 B2 | 8/2010 | Brunswig et al. | |
| 7,784,022 B2 | 8/2010 | Elfner et al. | |
| 7,797,370 B2 | 9/2010 | Brunswig et al. | |
| 7,818,683 B2 | 10/2010 | Sorin et al. | |
| 7,840,937 B1 * | 11/2010 | Chiluvuri | 717/106 |
| 7,849,175 B2 | 12/2010 | Beringer et al. | |
| 7,873,942 B2 | 1/2011 | Shaburov et al. | |
| 7,962,470 B2 | 6/2011 | Degenkolb et al. | |
| 8,214,737 B2 | 7/2012 | Botscheck et al. | |
| 8,237,664 B2 | 8/2012 | Swanbufg et al. | |
| 8,266,112 B1 | 9/2012 | Beatty et al. | |
| 8,271,882 B2 | 9/2012 | Botscheck et al. | |
| 8,346,895 B2 | 1/2013 | Cherdron et al. | |
| 8,352,963 B2 | 1/2013 | Boeckenhauer et al. | |
| 8,370,467 B1 * | 2/2013 | Sauer | H04L 69/02 709/217 |
| 8,429,549 B2 | 4/2013 | Zurmuehl et al. | |
| 8,458,617 B2 | 6/2013 | Victor | |
| 8,533,336 B1 * | 9/2013 | Scheffler et al. | 709/226 |
| 8,572,602 B1 * | 10/2013 | Colton et al. | 717/177 |
| 2002/0059425 A1 | 5/2002 | Belfiore et al. | 709/226 |
| 2003/0225920 A1 * | 12/2003 | Bussler et al. | 709/310 |
| 2004/0015954 A1 * | 1/2004 | Tuerke | H04L 67/02 717/173 |
| 2004/0268225 A1 | 12/2004 | Walsh et al. | |
| 2005/0086640 A1 * | 4/2005 | Kolehmainen | G06F 9/445 717/120 |
| 2006/0253586 A1 * | 11/2006 | Woods | G06F 17/30867 709/226 |
| 2007/0055964 A1 * | 3/2007 | Mirkazemi et al. | 717/140 |
| 2007/0078860 A1 | 4/2007 | Enenkiel | |
| 2007/0180049 A1 | 8/2007 | Chtcherbatchenko et al. | |
| 2009/0125722 A1 * | 5/2009 | Gomaa et al. | 713/176 |
| 2009/0198651 A1 * | 8/2009 | Shiffer | G06F 17/30 |
| 2009/0199213 A1 * | 8/2009 | Webster et al. | 719/320 |
| 2009/0271771 A1 * | 10/2009 | Fallows | 717/137 |
| 2009/0327995 A1 * | 12/2009 | Guo | G06F 8/30 717/106 |
| 2011/0016449 A1 * | 1/2011 | Yao et al. | 717/106 |
| 2011/0047527 A1 * | 2/2011 | Bird | G06F 8/30 717/107 |
| 2011/0078203 A1 | 3/2011 | Cohen et al. | |
| 2011/0088046 A1 * | 4/2011 | Guertler et al. | 719/317 |
| 2011/0314079 A1 * | 12/2011 | Karande | G06F 9/54 709/202 |
| 2012/0036457 A1 * | 2/2012 | Perlman et al. | 715/760 |
| 2012/0124480 A1 | 5/2012 | Cherdron et al. | |
| 2012/0198084 A1 * | 8/2012 | Keskitalo et al. | 709/228 |
| 2012/0226908 A1 * | 9/2012 | Mokrushin et al. | 713/168 |
| 2013/0024812 A1 | 1/2013 | Reeves et al. | |
| 2013/0124604 A1 * | 5/2013 | LeMaster | 709/203 |
| 2013/0125145 A1 * | 5/2013 | Balmori Labra et al. | 719/328 |
| 2013/0198296 A1 * | 8/2013 | Roy | G06Q 10/107 709/206 |
| 2013/0238695 A1 * | 9/2013 | Giraud et al. | 709/203 |
| 2014/0075422 A1 * | 3/2014 | Rasmussen | G06F 9/45516 717/148 |
| 2014/0364970 A1 * | 12/2014 | Goli | G06F 8/30 700/87 |

OTHER PUBLICATIONS

Tatsubori, M., et al., HTML templates that fly: a template engine approach to automated offloading from server to client, Proceedings of the 18th international conference on World wide web, 2009, pp. 951-960, [retrieved on Aug. 17, 2016], Retrieved from the Internet: <URL:http://dl.acm.org/>.*

* cited by examiner

ENTITY-BASED CROSS-APPLICATION NAVIGATION

This U.S. Patent Application claims priority under 35 U.S.C. §119(e) to U.S. Provisional Patent Application Ser. No. 61/822,163, filed on May 10, 2013. The entire contents of U.S. Provisional Patent Application Ser. No. 61/822,163 are hereby incorporated by reference.

BACKGROUND

Applications and application environments, for example business applications and portals, respectively, can vary technologically due to use of different software, hardware, and networking technologies as well as adoption of different software, networking, and user interface standards/protocols. Calling an application from another application to obtain data typically requires specific knowledge of the availability of the called application and how to properly interface with the called application and/or the application environment is it executing in. Changes to the called application and/or an associated application environment can require maintenance of the applications, interfaces, and/or application environment, resulting in a need to inform application/application environment users of the changes and updating of application/application environment software. Developers and support personnel must also typically be especially skilled in multiple hardware, software, networking, and/or other technologies in order to design, develop, and/or support applications calling other applications for data. Development/maintenance time and cost as well as the specialized knowledge requirements can result in a higher-than-necessary total cost of application/application environment ownership for an organization.

SUMMARY

The present disclosure relates to computer-implemented methods, computer-readable media, and computer systems for providing entity-based, cross-application navigation. One computer-implemented method includes receiving a request for data and callable entities associated with a provided entity context, transmitting the data and callable entities, receiving request for bootstrap code associated with a target application, generating bootstrap code containing an application environment runtime detection library and application environment navigation data, and transmitting the bootstrap code.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the transmitted data and callable entities comprise at least text, content type, and source fields and the transmitted data and callable entities are used to form hypermedia links.

A second aspect, combinable with any of the previous aspects, further comprising delegating handling of a selected hypermedia link source field to a content-type-capable delegate based on an analysis of the content type field associated with the hypermedia link.

A third aspect, combinable with any of the previous aspects, further comprising generating a request for bootstrap code by executing the source field.

A fourth aspect, combinable with any of the previous aspects, further comprising, with the delegate: receiving the transmitted bootstrap code; and executing the receiving the transmitted bootstrap code.

A fifth aspect, combinable with any of the previous aspects, further comprising detecting an application environment for the delegate.

A sixth aspect, combinable with any of the previous aspects, further comprising executing a navigation call to a target application based upon the detected application environment.

A seventh aspect, combinable with any of the previous aspects, wherein the target application is launched from the delegate.

The subject matter described in this specification can be implemented in particular implementations so as to realize one or more of the following advantages. First, an application A on a client is not tied to a server-side framework/application, in other words not coded against a server technology specific application programming interface (API) of the server-side framework/application. For example, application A can be based on JAVASCRIPT/HTML while associated server technology can be based on JAVA, RUBY, ABAP, or suitable. Within a representation state transfer (REST) software architecture, application A can use a uniform resource locator (URL) to query data of a resource entity using the open data protocol (ODATA) which uses hypertext transfer protocol (HTTP) as the communication channel. This decouples the client application A from changes made to the server-side framework/application and, in this example, HTTP becomes a decoupling protocol between different technology stacks of the client/server. Second, the client application A requires no knowledge of an application environment. Instead, a server executing a navigation framework transmits one or more hypermedia links (links) for available callable entities which are applications in the context of an entity and "bootstrap" code to the client. The client application A need only to provide an interface for a user to select one or more of the received links and to delegate the selected link to an appropriate control, application, operating system, and/or the like (hereafter "delegate") for execution. The received bootstrap code is then executed by the delegate. Third, calling from one client application A to another application for contextually-based data becomes a simple link selection action for a client application A user. Fourth, context is also automatically associated with the received link. For example, if a user John Smith selects a link from an employee information client application C to obtain a vacation schedule from an indicated related vacation schedule application D, a context of "John Smith" (e.g., in a link-included URL) can be associated with the link and the navigation framework determines calling options from client application C to the vacation schedule application D considering the provided context. Fifth, a detection/navigation library is included with the bootstrap code that understands how to deal with all possible environments that the calling application may run in, for example as a stand-alone application or in a portal environment. The library is centrally maintained to prevent fragmentation and errors. Appropriate developers can register their applications (and other callable entities) with a central authority that maintains the library. Sixth, the navigation bootstrap executes independently in the delegate without external assistance, analyzes the application environment, and determines the appropriate manner for navigation to a target application based on the determined application environment and data about the target application. The bootstrap code will also, invoke the navigation either through the application environment's API or directly. Seventh, any future changes of underlying platforms and UI technologies will not affect a client application as long as the underlying platforms and UI technologies (navigation framework) expose at least a link with a title, content (MIME) type, URL and to trigger a return of bootstrap code by the navigation framework upon selection of the link. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, computer-program products, and systems for providing entity-based, cross-application navigation. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

For the purposes of this disclosure, "cross-application navigation" means an action performed while a user is working with an application A to view data for an entity that launches a different application B to obtain additional data related to the data being viewed with application A. For example, the user could perform a selection action to select a hypermedia link from within application A to execute (launch) application B. An example use case could include a user viewing an entity, for example a particular product, employee data, contract, sales order, business contact, and the like, and application A-requested links to applications B and C are available to the user within application A to provide further contextual information regarding the viewed entity. In the case of a user viewing a product entity, presented links within application A could include links to application B with a "product details" title providing product manufacturer information/product details and to application C providing "live inventory information" for the product. In this example, selecting the link for application B can display product details for the viewed entity within the application A and/or application B user interface (UI). In order to perform the cross-application navigation, various issues need to be addressed:

How does application A know if other context-related applications (e.g., application B) exist?

How can a link selected within application A start application B?—the URL referring to application B needs to be properly constructed, and What is the proper URL to supply application B with information needed to present contextual information about the entity viewed in application A?—in other words, what is/are the name of URL parameters for the link to start application B in the proper context?

Applications may run as stand-alone or in one of various navigation runtimes, for example a portal, and one or more repositories may exist to maintain target URLs for the links. In addition, navigation runtimes can also have their own repositories. Application A (or at least the programming framework it uses) needs to know if it is executing as stand alone or in a navigation runtime and must use different methods of invoking app B depending upon where it is executing.

The present disclosure describes a navigation framework that provides context-appropriate hypermedia links in the form of callable entities to start applications related to the data entities used in an executing client application. At a minimum, each link should include a title, content (MIME) type, and callable entity identifier, e.g., a URL. The navigation framework also provides "bootstrap" code to the client following selection of a provided link. Selection of the provided link triggers the delegation of the handling of the link to an appropriate control, container, operating system, etc. (hereafter "delegate"). The delegate then executes the URL and requests the bootstrap code. The navigation framework returns generated "bootstrap" code including a detection/navigation library. The delegate, using the detection/navigation library, analyzes the application environment of the client application and automatically selects an appropriate calling method (included in the detection/navigation library as part of the bootstrap code) to the target application indicated by the selected link.

Figure 1:
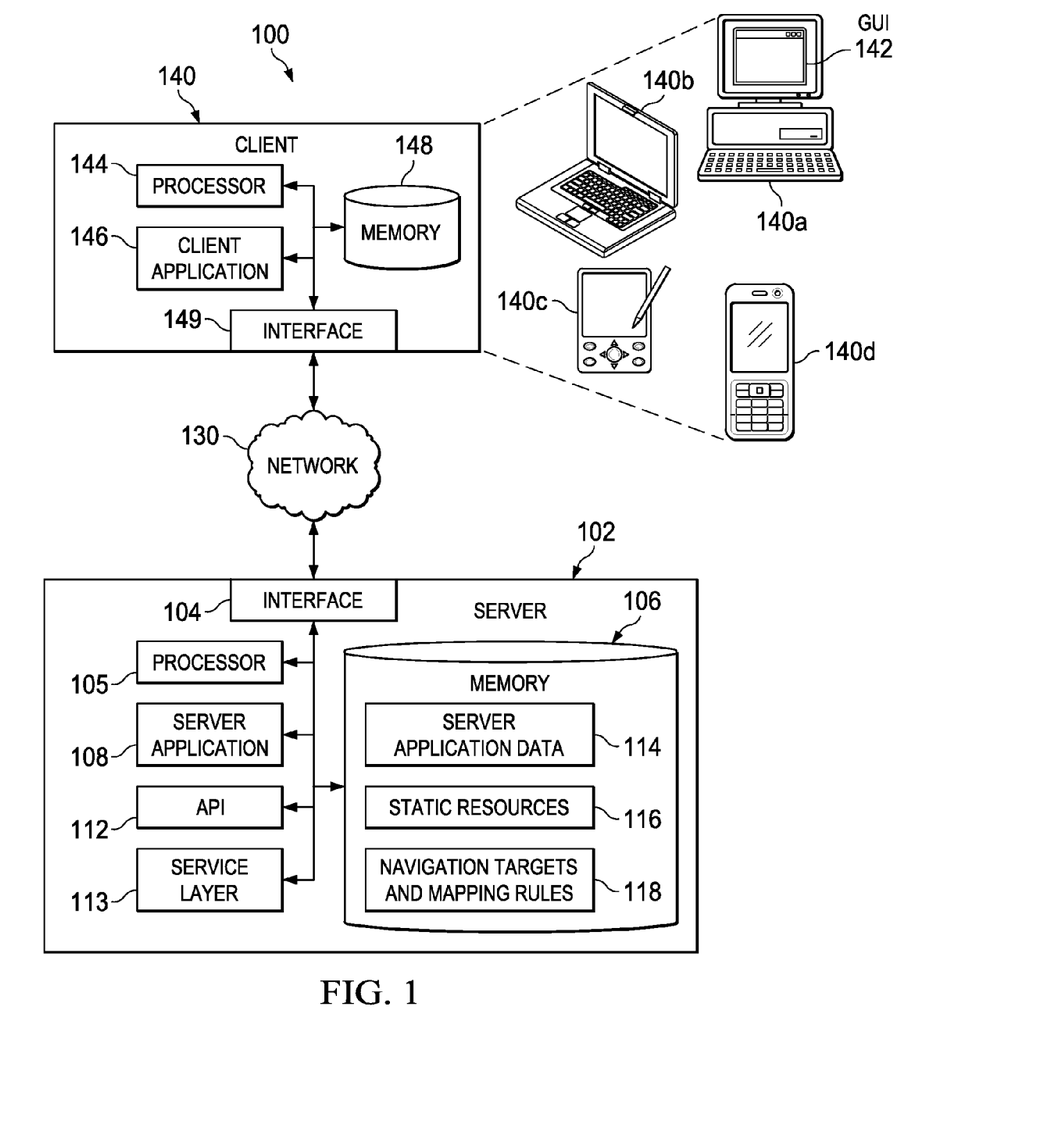
FIG. 1 is a block diagram illustrating an example distributed computing system for providing entity-based, cross-application navigation according to an implementation.

FIG. 1 is a block diagram illustrating an example distributed computing system (EDCS) 100 for providing entity-based, cross-application navigation according to an implementation. The illustrated EDCS 100 includes or is communicably coupled with a server 102 and a client 140 that communicate across a network 130. In other implementations, other appropriate computing components can be coupled to the EDCS 100. In some implementations, the EDCS 100 can be a cloud-computing environment.

At a high level, the server 102 is an electronic computing device operable to receive, transmit, process, store, or manage data and information associated with the EDCS 100. According to some implementations, server 102 may also include or be communicably coupled with an e-mail server, a web server, a caching server, a streaming data server, and/or other suitable server. The following described computer-implemented methods, computer-readable media, computer systems, and components of the example distributed computer system 100 provide functionality through one or more graphical user interfaces (GUIs) providing an efficient and user-friendly presentation of data provided by or communicated within the EDCS 100.

In general, the server 102 is a server that stores and/or executes one or more server applications 108 interacted with using requests and responses sent by clients 140 within and communicably coupled to the illustrated EDCS 100. In some implementations, the server 102 may comprise a web server, where the one or more server applications 108 represent one or more web-based applications accessed and executed by the client 140 using the network 130 or directly at the server 102 to perform the programmed tasks or operations of a particular server application 108.

The server 102 is responsible for receiving requests/responses using the network 130, for example login requests, server application 108 requests, and/or other suitable requests/responses from one or more client applications 146 (described below) associated with the client 140 of the EDCS 100 and responding to the received requests by processing said requests in the one or more server applications 108. In addition to requests/responses from the client 140, requests/responses may also be sent to the server 102 from internal users, external or third-parties, other automated applications, as well as any other appropriate entities, individuals, systems, or computers whether or not illustrated.

In some implementations, the server application 108 can provide GUI interfaces for a client/server, cloud-based, or other suitable environment. For example, a request to launch a client application can be performed using a GUI tool interface accessible to a user on a particular client 140.

In some implementations, any and/or all components of the server 102, both hardware and/or software, may interface with each other and/or the interface using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure.

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130. Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required to provide entity-based, cross-application navigation.

The server 102 also includes a memory 106 that holds data for the server 102, client 140, and/or other components of the EDCS 100. Although illustrated as a single memory 106 in FIG. 1, two or more memories may be used according to particular needs, desires, or particular implementations of the EDCS 100. While memory 106 is illustrated as an integral component of the server 102, in alternative implementations, memory 106 can be external to the server 102 and/or the EDCS 100. In some implementations, the memory 106 includes one or more instances of server application data 114, static resources 116, and/or navigation targets and mapping rules 118.

The static resources 116 is made up of the detection/navigation library(ies) (hereafter "library") as well as other resources needed to generate bootstrap code. In one implementation, the library is represented by a text document containing JAVASCRIPT code. Static resources 116 can also include images, CSS files, and any type of data not dynamically created though program execution. In some implementations, the library can be represented in any suitable language or manner. The detection functionality of the library can serve to analyze, by any suitable means, the current application environment the bootstrap code is executing in. For example, the library can determine that it is running in a stand-alone browser or within a portal environment. The navigation aspects of the library can provide appropriate navigation methods to call a desired application based on the determined application environment (see discussion related to FIG. 2 below).

In some implementations, the static resources 116 can be directly accessed by any suitable component of the EDCS 100, for example the server application 108, and/or the client 140. While the static resources 116 are illustrated as an integral component of the memory 106, in alternative implementations, the static resources can be stored wholly or partially external to the memory 106 (e.g., stored in memory 148) and/or be separated into both an external static resources 116 and an internal static resources 116 as long as accessible using network 130. In some implementations, the static resources 116 can interface with and/or act as a reference to an internal and/or external storage location and/or provide functionality to retrieve static resources 116 data stored in an external storage location. In some implementations, the static resources 116 can be refined through additions, modifications, and/or deletions by the server application 108, and/or the client 140. In some implementations, the static resources 116 can be generated, stored, and/or converted from/into any suitable format or form, for example, binary, text, numerical, a database file, a flat file, or the like and can be split into smaller modules or aggregate into larger modules.

The navigation targets and mapping rules (NTMR) 118 form a persistency database for the server application 108. The NTMR 118 may represent, in any suitable format, data, policies, conditions, parameters, variables, algorithms, instructions, constraints, references, and any other appropriate information used by the server application 108 to determine the application environment for a calling application and a proper format for various calls to target applications depending upon the application environment of the calling application. The NTMR 118 can be organized in various ways and be represented by any suitable data structure, for example a relational/in-memory database, flat file, and the like.

Although shown as integral to the server 102, in some implementations, the NTMR 118 can be stored remotely from the server 102 as long as the NTMR 118 is accessible by the server 102. The NTMR 118 may be accessed, for example, using a web service, a remote access system or software, a local or remote client 140, or other suitable system component. In some implementations, access to the NTMR 118 can be restricted by security policies and/or procedures. In some implementations, the NTMR 118 can be updated to reflect changes to target applications and application environments; required parameters, data, and formats for target applications; and the like. In some implementations, multiple NTMRs 118 can be used, for example one for each particular application environment or target application.

While the NTMR 118 is illustrated as an integral component of the memory 106, in alternative implementations, the NTMR 118 can be external to the memory 106 and/or be separated into both an external NTMR 118 and an internal NTMR 118 as long as it is accessible using network 130. In some implementations, the NTMR 118 can act as a reference to another NTMR 118, internal and/or external storage location, and/or provide functionality to interface with and/or retrieve one or more other NTMRs 118. In some implementations, a separate data structure (not illustrated) can be used as a reference to the data stored within a particular NTMR 118.

The server application 108 is any type of application that allows the client 140 to request, view, add, edit, delete, and/or consume content on the client 140 obtained from the server 102, another client 140, and/or an additional content provider (not illustrated) in response to a received request from the client 140. A content provider may be, for example, applications and data on and/or provided by a server and/or external services, business applications, business application servers, databases, RSS feeds, document servers, web servers, streaming servers, caching servers, or other suitable content sources.

In some implementations, the server application 108 can also be associated with server application data 114, including business objects and data, user profiles, business processes, content provider locations, addresses, data storage locations/specifications, content lists, access requirements, and/or other suitable data. The business application data 114 can be represented by any type of suitable data structure(s) and in any suitable format(s). For example, the business application data 114 could be an executable module, spreadsheet, database, flat file, binary file, multi-part file, linked list, and/or the like.

Once a particular server application 108 is launched, a client 140 may interactively process a task, event, or other information associated with the server 102. The server application 108 can be any application, program, module, process, or other software that may also execute, change, delete, generate, or otherwise manage information associated with a particular client 140. For example, the business application 108 may be a portal application, a business application, and/or other suitable application consistent with this disclosure. The server application 108 can also interface with other server applications 108 and/or other suitable component of the EDCS 100 to wholly or partially complete a particular task. For example, the described components could provide entity-based, cross-application navigation in a sequential, parallel, and/or other suitable manner.

Additionally, a particular server application 108 may operate in response to and in connection with at least one request received from other server applications 108, including server applications 108 or other components (e.g., software and/or hardware modules) associated with another server 102. In some implementations, the server application 108 can be and/or include a web browser. In some implementations, each server application 108 can represent a network-based application accessed and executed using the network 130 (e.g., through the Internet, or using at least one cloud-based service associated with the server application 108). For example, a portion of a particular server application 108 may be a web service associated with the server application 108 that is remotely called, while another portion of the server application 108 may be an interface object or agent bundled for processing at a remote client 140. Moreover, any or all of a particular server application 108 may be a child or sub-module of another software module or enterprise application (not illustrated) without departing from the scope of this disclosure. Still further, portions of the particular server application 108 may be executed or accessed by a user working directly at the server 102, as well as remotely at a corresponding client 140. In some implementations, the server 102 or any suitable component of server 102 or the EDCS 100 can execute the server application 108.

The calling application should not need to be modified due to the existence of and/or changes to other related (or target) applications or due to the environment the related applications execute in. In other words the calling application has code stability. The calling application should also not be programmed against the other related applications and their environments, etc. In other words, the calling application should not be target-application aware and should not need to invoke a target application using an environment-aware target application invocation. Target application discovery by the calling application should be performed generically. In some implementations, the calling application code can be modified due to the existence of and/or changes to target applications or due to the environment the related applications execute in. In some implementations, the calling application can be target-application aware and/or use one or more environment-aware target application invocations.

The server application 108 provides functionality to provide to the calling application, callable entity data in the forms of hypermedia links to associated target applications. Once a calling application is started, a generic call can be made to a server application 108 to return callable entities associated with the calling application. In some implementations, the callable entities contain at least a title, content type, and a media URL to a particular target application. Upon selection of the hypermedia link, the server application 108 analyzes a business context associated with the hypermedia link URL and provides context-appropriate bootstrap code which when executed by a calling-application-delegated control, application, etc. (a delegate) can analyze the delegate's application environment and select a provided call in the bootstrap code based on the determined application environment to navigate to the desired target application.

Figure 2:
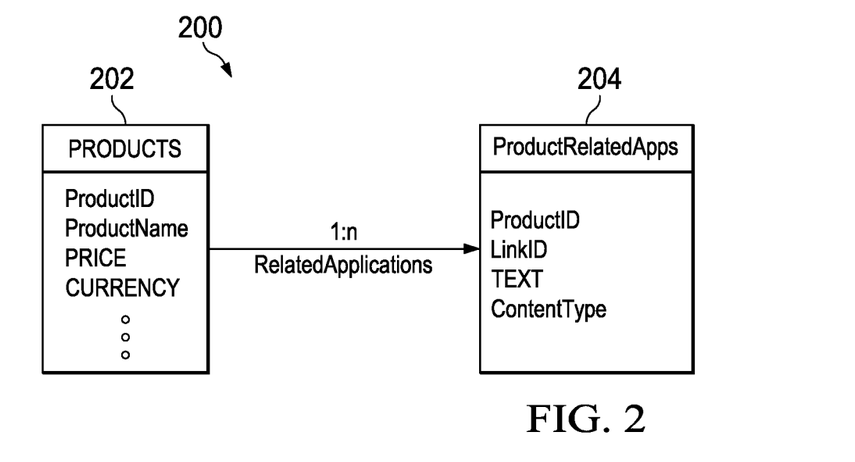
FIG. 2 is a block diagram illustrating an entity-relationship diagram of an entity and callable entity according to an implementation.

FIG. 2 is a block diagram 200 illustrating an entity-relationship diagram of an entity and callable entity according to an implementation. A callable entity is a data set (e.g., text, content type, and source) allowing initiation of target applications with a provided entity context. Entity Products 202 represents products, for example, a computer, automobile, cellular telephone, and the like. Products 202 has associated properties (e.g., ProductID, ProductName, Price, Currency) and methods (not illustrated). Associated callable entity ProductRelatedApps 204 is shown as related in a 1-to-many relationship. The callable entity has exactly one parent entity. To retrieve related applications for a particular product, a call is made to ProductRelatedApps 204 supplying the same identifiers that (e.g., ProductID, in the example.) that are used to get the data (property values) of the parent entity. For example to obtain property values for ProductID='1234', the following URL:

```
/procurement/Products(ProductID='1234')
returns product data:
    ProductID: 1234
    ProductName: Notebook XYZ1234 with Hyperion Processor
    Price: 2499
    Currency: USD
```

To retrieve related applications for ProductID='1234', the following URL:

```
/procurement/Products (ProductID='1234')/RelatedApplications
returns a list of links with a text title and content described in Atom Publishing Protocol
(ATOM)
format (i.e., content (MIME) type, and URL) to related applications for product "1234":
  1. /procurement/ProductApps(ProductID='1234', LinkID='1')
     Text: Display Product Details
     ContentType: 'text/html'
     src: /procurement/ProductApps(ProductID='1234', LinkID='1')/$value
  2. /procurement/ProductApps(ProductID='1234', LinkID='2')
     Text: Display Product's Supplier Details
     ContentType: 'text/html'
     src: /procurement/ProductApps(ProductID='1234', LinkID='2')/$value
```

It should be noted that a callable entity as well as the callable entity content could also be returned described in the JAVASCRIPT object notation (JSON) format or other suitable format. In some implementations, the server application 108 can return the content in more than one suitable format.

Once the links have been returned by the server application 108 to the calling application, the calling application can display the links within the application. If an application user wishes to obtain additional data related to Product 1234, the user can select either link 1 or link 2. For example, selecting link 2 (Text: Display Product's Supplier Details) from the provided list of links will result in the server application 108 generating bootstrap code to execute in a calling-application-delegate (e.g., a browser, application, control, etc.). In this example, the "/$value" acts as a trigger to the server application 108 to generate the bootstrap code, but as will be appreciated by those of skill in the art, any such value can be used without departing from the scope of this disclosure.

One example representation of generated bootstrap code could be:

```
<html>
  <head>
    <script src="bootstrap.js"></script>
  </head>
<body>
  <script>
    var bootstrapData = [
      "standalone" : { url:
      "http://www.company.org/DisplaySupplier/?supplierID=ABC" },
        "hub1" : { targetApplication:"Display_Supplier", Data: {
    supplierID:"ABC" } },
        "hub2" : { targetID:"TGT175", params: { field1:"ABC" } } ];
    Bootstrap.navigate(bootstrapData);
  </script>
</body>
</html>
```

Here the bootstrap.js code provides application environment detection functionality. For example, the bootstrap.js could contain functionality similar to:

```
switch checkBrowser( )
    When 'BrowserVendor1'
        . . .
    When 'Browser Vendor2'
Switch device( )
    When 'phone'
        . . .
    When 'tablet'
        . . .
    When 'desktop'
        . . .
```

-continued

```
If hub1API != null.
    Perform hub1 execution
else if hub2API != null
    . . .
``` to detect a browser, a device, and whether it is executing in a navigation runtime, etc.

Here the illustrated bootstrap code also provides appropriate navigation methods to call the desired target application (link 2 (Text: Display Product's Supplier Details)) based on the determined application environment as part of the static resources 116 library. For example, the following navigation options were returned by the server application 108 as part of the bootstrap code:

```
var bootstrapData =[
   "standalone" : { url:
"http://www.company.org/DisplaySupplier/?supplierID=ABC" },
   "hub1" : { targetApplication:"Display_Supplier", Data:
{ supplierID:"ABC" } },
   "hub2" : { targetID:"TGT175", params: { field1 :"ABC" } }
];
```

Note that three options are returned with the bootstrap data by the server application 108: 1) standalone; 2) hub1; and 3) hub2. Depending on the determined application environment, the appropriate call to display supplier information for a supplier "ABC" can be used. If the library code is running in a stand-alone environment, for example in MICROSOFT WINDOWS, MAC OS, LINUX, and the like, a call appropriate to that application environment can be made using an available HTML-compliant browser using the "standalone" URL "http://www.company.org/Display-Supplier/?supplierID=ABC." On the other hand, if the library code is running in a hub-type application environment of type "hub1" or "hub2," and appropriate call using the received bootstrapData for "hub1" or "hub2" can be used. Note that options to navigate to a callable entity from all of the possible application environments where a particular client application is permitted to run are represented at the same time in the library. In some implementations, the navigation options can be limited, for example by an exclusion list, user permission levels/role, or other suitable method.

The server application 108 can be any application, program, module, process, or other hardware/software (or combination of) capable of providing the above-described data. Although illustrated as integral to server 102, in some implementations, the server application 108 can be standalone, for example as part of a separate server communicating using network 130. In some implementations, the server application 108 can be incorporated, wholly or partially into any component of the EDCS 100. In some implementations the server application 108 may be part of a hardware server, a software server, a virtual server, a web server, a streaming server, an RSS server, or other suitable server. In some instances various functionality of the server application 108 can be separated into two or more separate applications. For example, the functionality to provide callable entity data and/or bootstrap code could be performed by one or more applications interfacing with the server application 108 either locally or remotely to server 102.

The client 140 may be any computing device operable to connect to or communicate with at least the server 102 using the network 130. In general, the client 140 comprises an electronic computing device operable to receive, transmit, process, and store any appropriate data associated with the EDCS 100. Typically the client 140 will process and/or respond (both automatically and/or by manual user interaction) to requests and/or responses generated by the server 102, for example software code received from the server application 108. The client typically includes a processor 144, a client application 146, a memory 148, and/or an interface 149.

The client application 146 is any type of application that allows the client 140 to navigate to/from, request, view, edit, delete, and or manipulate content on the client 140, for example using an HTML 5-, IOS-, or ANDROID-based application. In some implementations, the client application 146 can be and/or include a web browser. In some implementations, the client-application 146 can use parameters, metadata, and other information received at launch to access a particular set of data from the server 102 and/or other client 140. Once a particular client application 146 is launched, a user may interactively process a task, event, or other information associated with the server 102 and/or other client 140. Further, although illustrated as a single client application 146, the client application 146 may be implemented as multiple client applications in the client 140. In some implementations, the client application 146 may act as a GUI interface for the server application 108 and/or other components of server 102 and/or other components (not illustrated) of the EDCS 100.

The interface 149 is used by the client 140 for communicating with other computing systems in a distributed computing system environment, including within the EDCS 100, using network 130. For example, the client 140 can use the interface 149 to communicate with the server 102 as well as other clients 140 and/or systems (not illustrated) that can be communicably coupled to the network 130. The interface 149 may be consistent with the above-described interface 104 of the server 102 or other interfaces within the EDCS 100. The processor 144 may be consistent with the above-described processor 105 of the server 102 or other processors within the EDCS 100. Specifically, the processor 144 executes instructions and manipulates data to perform the operations of the client 140, including the functionality required to send requests to the server 102 and to receive and process responses from the server 102. The memory 148 typically stores objects and/or data associated with the purposes of the client 140 but may also be consistent with the above-described memory 106 of the server 102 or other memories (not illustrated) within the EDCS 100, and can be used to store data similar to that stored in the other memories of the EDCS 100 for purposes such as backup, caching, and the like.

Further, the illustrated client 140 includes a GUI 142. The GUI 142 interfaces with at least a portion of the EDCS 100 for any suitable purpose, including generating a visual representation of a web browser. The GUI 142 may be used to view and navigate among various web pages located both internally and externally to the server 102, view data associated with the server 102 and/or the client 140, or any other suitable purpose. In particular, the GUI 142 may be used in conjunction with content from server 102 and/or the client 140 to provide entity-based, cross-application navigation.

There may be any number of clients 140 associated with, or external to, the EDCS 100. For example, while the illustrated EDCS 100 includes one client 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142, as shown with respect to the client 140.

Figure 3:
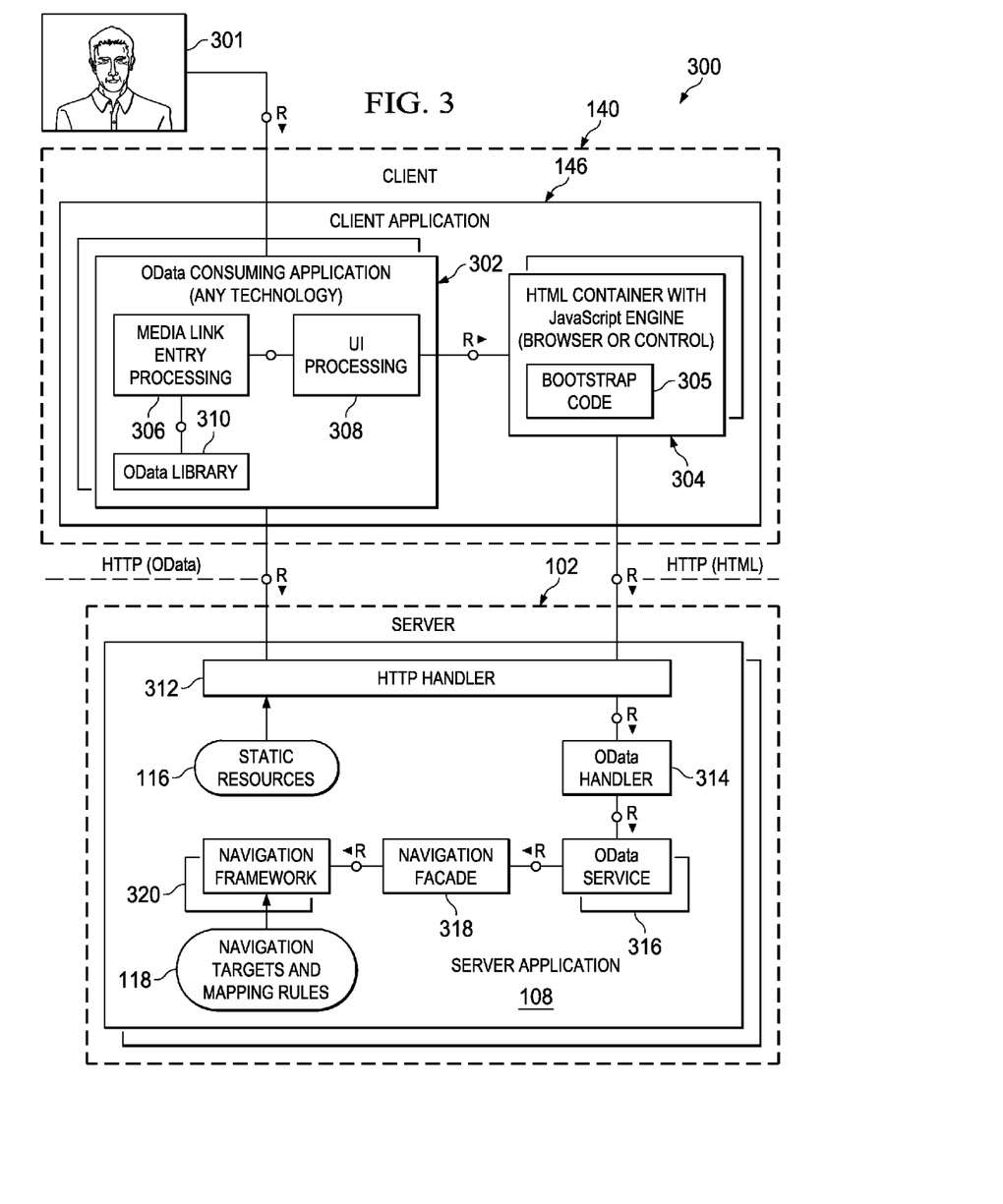
FIG. 3 is a block diagram illustrating sub-components of a client application and a navigation framework according to an implementation.

FIG. 3 is a block diagram 300 illustrating sub-components of a client application 146 and a server application 108 according to an implementation. Client application 146 as part of client 140 and the server application 108 as part of server 102 are illustrated.

The client application 146 is made up of an OData consuming application (of any technology) 302 and an HTML Container with JavaScript Engine (e.g., a browser or control) 304. The OData consuming application 302 is made up of a media and link entry processing 306, UI processing 308, and OData Library 310. The media link entry processing 306 handles hypermedia link entries. For example:

```
If content type of media link entry is html
    Send link to html container
Else if content type of media link entry is image
    Load Image data and render Image using Image Control
Else if content type is pdf
    Pass link to adobe reader
```

The OData library 310 provides a programming library for OData handling in a particular technology that the calling application is built upon, for example JAVASCRIPT, OData, etc. The UI processing 308 handles user interactions. For example, a user 301 selection of a hypermedia link is processed and handled by the UI processing 308. I some implementations, the UI processing 308 can provide some or all of the UI functions for the client application 146. The HTML container 304 is shown with bootstrap code 305 that is executed by the HTML 304 container once received from the server application 108. The bootstrap code 305 here is an HTML file generated by either a navigation façade or navigation framework (both described below) and loaded by a browser. The bootstrap code 305 contains HTML code to load JavaScript libraries and other static resources 116 and contains server-102-generated information about a target application and data that should be passed to the target application.

The server application 108 is made up of an HTTP handler 312, static resources 116 (described above), OData handler 314, OData service 316, navigation façade 318, navigation framework 320, and NTMR 118 (described above). The HTTP handler 312 handles all network traffic sent to the server using the hypertext transfer protocol (HTTP). The OData handler 314 is a master handler service that handles HTTP requests using the OData protocol. The OData service 316 is one of many OData services for a particular area of use. For example, sales administration, procurement, or control. The main purpose of the OData service 316 is to serve or maintain data from a particular area of use, such as a list of sales orders, purchase orders, or billing documents. The OData service 316 uses the navigation framework 320 and/or navigation façade 318 for delivering and handling callable entities. The navigation framework 320 is an infrastructure in the server 102 that allows the launch of applications for users 301 with a context. The navigation framework 320 is able to store and read necessary data about the application and has the capability to map business data into a format expected by a target application. For example, if a target application is started using a URL and query parameters, the target application in the NTMR 118 often has key/value mapping rules such as ProductID=PROD_ID, so the query parameter name changes in the target applications URL. The navigation framework 320 creates necessary query parameters to call the target application. The navigation framework can also be template based. For example, "PROD_ID={ProductID}". The navigation framework mapping engine (not illustrated) typically substitutes a placeholder value, such as '{ProductID}' with an actual value. The navigation façade 318 is an application programming interface/API placed in front of multiple navigation frameworks 320 to provide homogenous access to the navigation frameworks 320. The navigation façade 318 allows the OData service 316 to select and offer navigation targets from different navigation frameworks 320 without knowing about the different APIs of individual navigation frameworks 320. The navigation façade 318 translates the uniform access into the individual communication requirements of the various navigation frameworks 320 and generates code, for example HTML, for the bootstrap code. In an implementation where there is a single navigation framework 320, the navigation façade 318 may be a part of the navigation framework 320 and the creation of the bootstrap code HTML would take place in the navigation framework 320.

Figure 4:
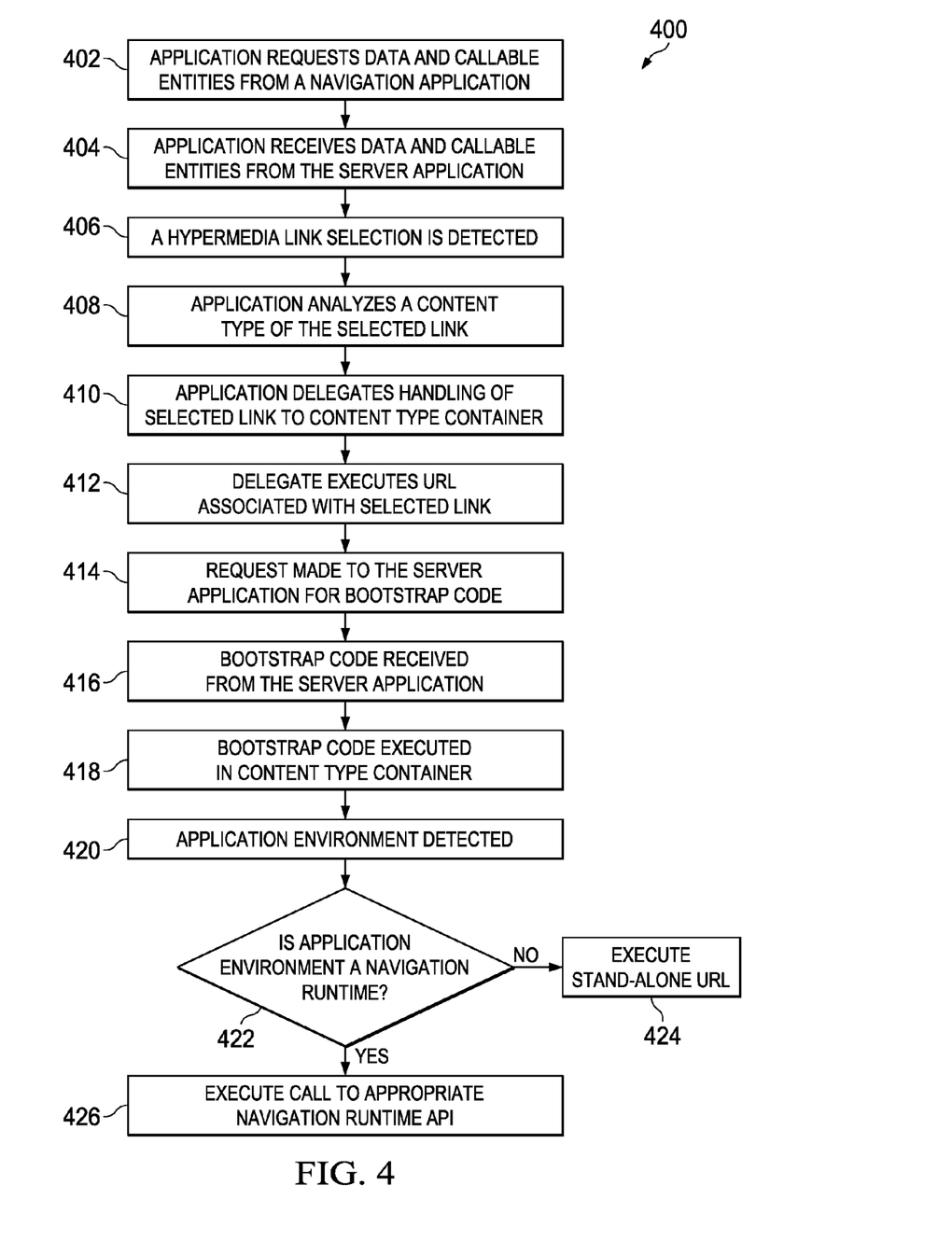
FIG. 4 is a flow chart illustrating a method for providing entity-based, cross-application navigation according to an implementation.

FIG. 4 is a flow chart illustrating a method for providing entity-based, cross-application navigation according to an implementation. For clarity of presentation, the description that follows generally describes method 400 in the context of FIGS. 1, 2, and 3. However, it will be understood that method 400 may be performed, for example, by any other suitable system, environment, software, and hardware, or a combination of systems, environments, software, and hardware as appropriate. In some implementations, various steps of method 400 can be run in parallel, in combination, in loops, or in any order.

At 402, a request is made by an application to a server application for data and callable entities related to entity data viewed in the application. In some implementations, the entity data was generated by the business application. Referring back to FIG. 2 and associated description, a request similar to:

/procurement/Products (ProductID='1234')/RelatedApplications could be used to return the requested data and callable entities. From 402, method 400 proceeds to 404.

At 404, the application receives the requested data and callable entities in the form of hypermedia links from the server application (refer to the discussion related to FIG. 2 for additional detail). The application presents the hypermedia links in a user interface for user selection. From 404, method 400 proceeds to 406.

At 406, a hypermedia link (link) selection is detected. In some implementations, the hypermedia link is selected by an application user. In some implementations, the link can be selected by an automated process, program, script, and the like. From 406, method 400 proceeds to 408.

At 408, the application analyzes the content type of the selected link. From 408, method 400 proceeds to 410.

At 410, the application delegates handling of the selected link to an appropriate content type container, control, application, etc. (hereafter "delegate"). For example, a content type of 'text/html' can be delegated to a HTML-compliant browser. From 410, method 400 proceeds to 412.

At 412, the delegate executes the URL associated with the selected link. From 412, method 400 proceeds to 414.

At 414, a request is generated from the delegate to the server application for bootstrap code satisfying the context of the selected link URL. Note, in some implementations, 412 and 414 can be combined into one action where execution of the URL associated with the selected link generates the request. From 414, method 400 proceeds to 416.

At 416, bootstrap code is received by the delegate from the server application. From 416, method 400 proceeds to 418.

At 418, the received bootstrap code is executed in the delegate. The bootstrap code typically contains code to detect the application environment both the application and delegate are running on as well as a list of data for appropriate calls to a target application, depending upon the determined application environment. From 418, method 400 proceeds to 420.

At 420, the application environment is detected by the delegate executing the bootstrap code. From 420, method 400 proceeds to 422.

At 422 a determination is made whether the application environment is a navigation runtime (e.g., a "hub" or portal). If it is determined that the application environment is not a navigation runtime, method 400 proceeds to 424 where a stand-alone-formatted call is selected from the bootstrap code and executed to call a target application. If it is determined that the application environment is a navigational runtime, method 400 proceeds to 426.

At 426, a call for an appropriately determined navigation runtime is selected in the bootstrap code and executed to call the target application using an API, etc. of the navigation runtime. After 426, method 400 stops.

Figure 5A:
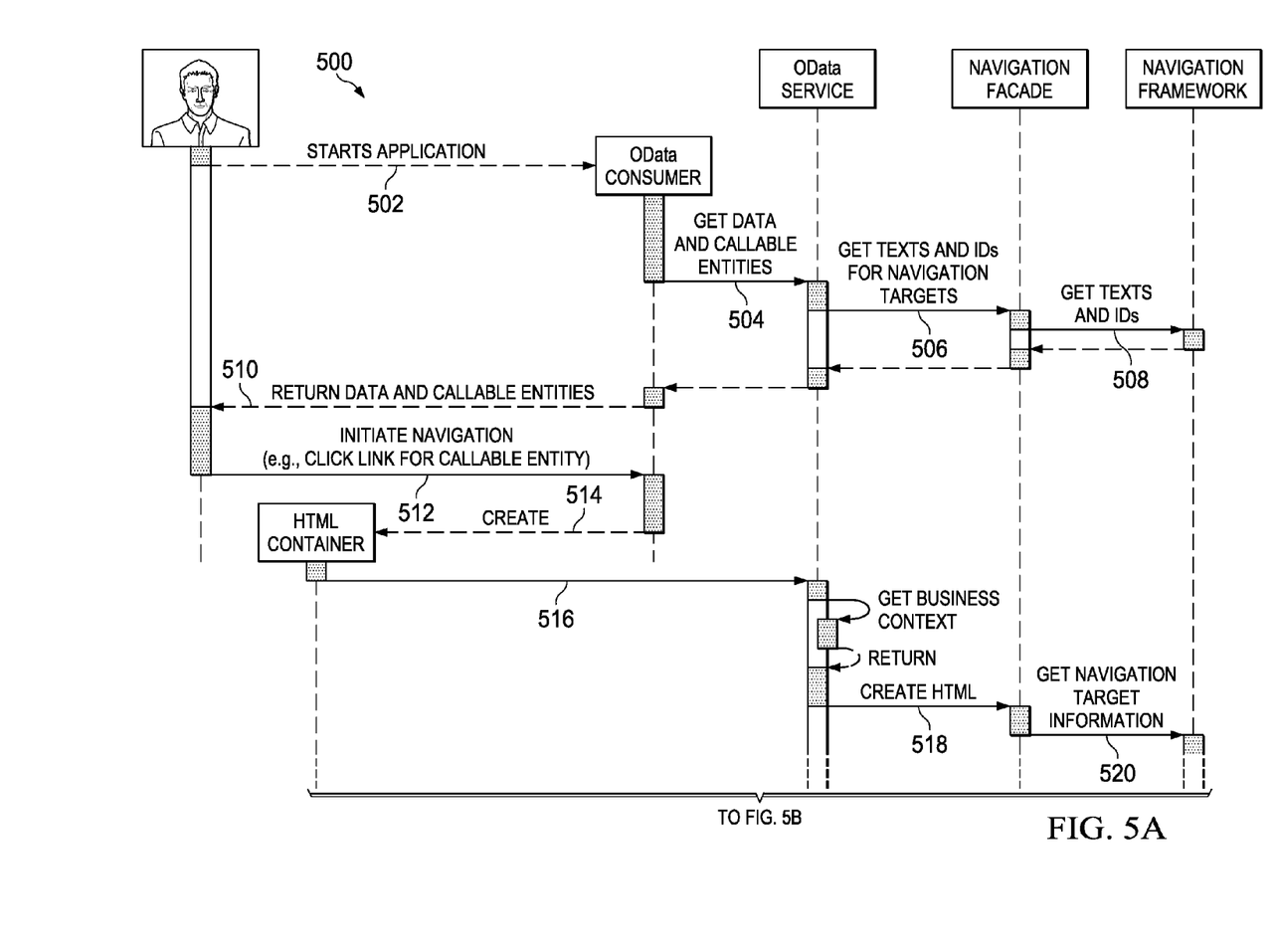
FIGS. 5A & 5B represent a sequence flow diagram illustrating a method for providing entity-based, cross-application navigation according to an implementation.
Figure 5B:
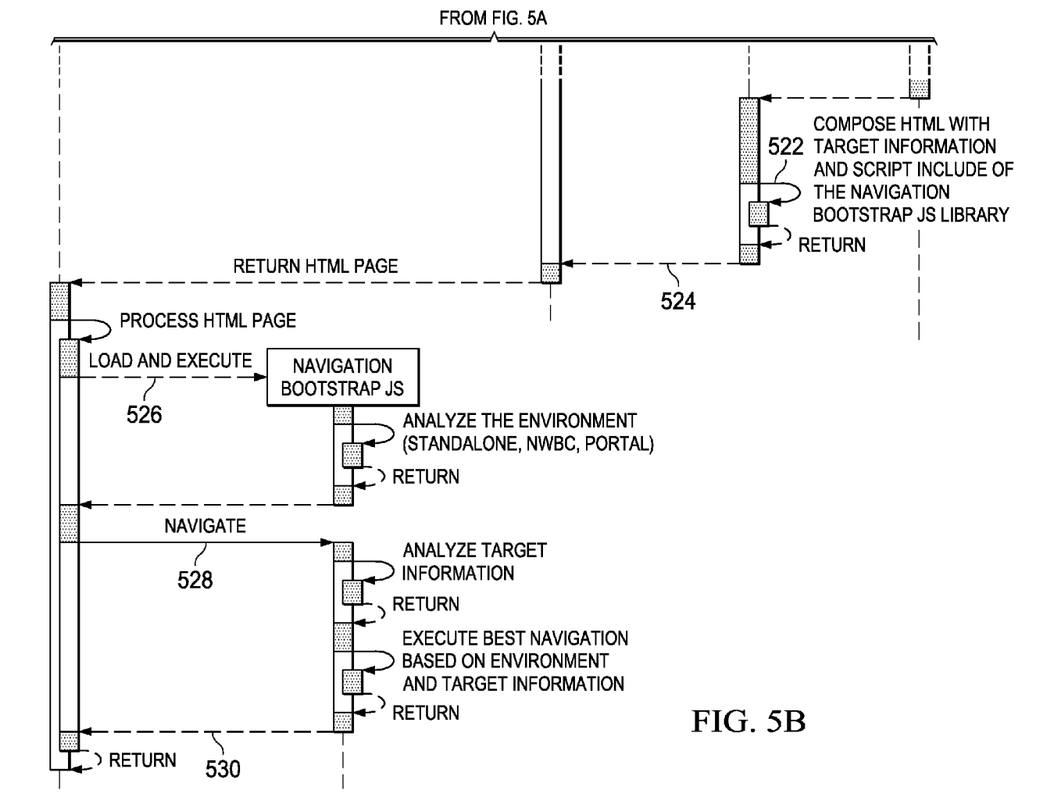

FIGS. 5A & 5B represent a sequence flow diagram 500 illustrating a method for providing entity-based, cross-application navigation according to an implementation. For clarity of presentation, the description that follows generally describes flow 500 in the context of FIGS. 1, 2, 3, and 4. However, it will be understood that flow 500 may be performed, for example, by any other suitable system, environment, software, and hardware, or a combination of systems, environments, software, and hardware as appropriate. In some implementations, various steps of flow 500 can be run in parallel, in combination, in loops, or in any order.

Referring to FIG. 5A, at 502, a user starts an application (an OData consumer). From 502, flow 500 proceeds to 504.

At 504, a request is made from the OData consumer for data and callable entities related to entity data viewed in the application. The requested data (e.g. the product data from the example provided in the discussion of FIG. 2) is created based on an individual OData Service implementation Note that retrieving the requested data is not illustrated in FIG. 5 as it is not relevant for the UI navigation described in the sequence flow diagram 500. From 504, flow 500 proceeds to 506.

At 506, a request is made to the navigation façade for text and IDs for navigation targets to create the callable entities. From 506, flow 500 proceeds to 508.

At 508, a request is made from the navigation façade to the navigation framework for text and IDs. The navigation framework returns the text and IDs. The text and IDs are returned to the navigation façade and then to the OData service which converts the texts and IDs into callable entities and returns the callable entities to the OData consumer. From 508, flow 500 proceeds to 510.

At 510, presentation of the requested data and callable entities to the user is initiated by the OData consumer. In some implementations, the data and callable entities are visualized in the form of hypermedia links From 510, flow 500 proceeds to 512.

At 512, navigation to a callable entity is initiated, for example by the user clicking a link. The OData consumer detects the navigation initiation. From 512, flow 500 proceeds to 514.

At 514, an HTML container (delegate) is created by the OData consumer. For example, the hypermedia link may have had a content (MIME) type of 'text/html' and the OData consumer initiates creation of a browser to delegate handling of the link URL to. From 514, flow 500 proceeds to 516.

At 516, the delegate executes the URL which is handled by the OData service. The OData service then gets the business context from the URL. For example, a product ID, user ID or the like can be retrieved from the executed URL to provide context. From 516, flow 500 proceeds to 518.

At 518, the OData service asks the navigation façade to generate the bootstrap code HTML for the target application requested in the URL and passes the business context so it is included in the bootstrap data inside of the generated HTML. From 518, flow 500 proceeds to 520.

At 520, the navigation façade initiates a get for navigation target information from the navigation framework. From 520, flow 500 proceeds to 522.

Referring to FIG. 5B, at 522, the navigation framework composes the HTML with target information and script(s) including the navigation bootstrap library and returns the HTML to the navigation façade. From 522, flow 500 proceeds to 524.

At 524, the navigation façade returns the composed bootstrap code HTML to the OData service which returns the bootstrap code to the delegate. From 524, flow 500 proceeds to 526.

At 526, the delegate loads and executes the navigation bootstrap JAVASCRIPT (bootstrap code). The bootstrap code analyzes the application environment and returns the determined application environment to the delegate. From 526, flow 500 proceeds to 528.

At 528, the delegate executes the best/appropriate navigation call (e.g. stand-alone, navigation runtime, etc.) based on the determined application environment. From 528, flow 500 proceeds to 530.

At 530, the application target is launched from the delegate. From 530, flow 500 stops.

FIGS. 1-5, illustrate and describe various aspects of computer-implemented methods, computer-readable media, and computer systems providing an integrated development environment for client/server environments. As will be apparent to one of skill in the art, the described computer-implemented methods, computer-readable media, and computer systems can be applied to any type of application software consistent with this disclosure. The present disclosure is not intended to be limited to the described and/or illustrated implementations, but is to be accorded the widest scope consistent with the principles and features disclosed herein.

Although the concepts herein have been described primarily in terms of OData with ATOM/JSON, HTTP, HTML, and JAVASCRIPT technologies, the use of these technologies describe only one or more possible implementations and are not intended to limit the disclosure in any way. Those of skill in the art will appreciate that these technologies can be substituted and appropriate changes made to the described technology without deviating from the spirit and scope of the disclosure. The present disclosure is not intended to be limited to the described and/or illustrated implementations, but is to be accorded the widest scope consistent with the principles and features disclosed herein.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDFLOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to and/or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving a request from a client application for data and callable entities related to entity data viewed in the client application, the callable entities capable of displaying the data, the data in addition to the entity data viewed in the client application, and the request including a provided entity context;
transmitting the data and callable entities to the client application;
receiving a request for bootstrap code associated with a target application, the request for bootstrap code received from a content-type-capable delegate assigned by the client application following at least a selection in the client application of a hypermedia link associated with the target application and formed from the transmitted data and callable entities, client application analysis of a component type of the selected hypermedia link, and the content-type-capable delegate executing a uniform resource locator associated with the selected hypermedia link;

generating bootstrap code containing an application environment runtime detection library and application environment navigation data, where the generated bootstrap code, when executed by the content-type-capable delegate analyzes the content-type-capable delegate's application environment and selects a provided call in the bootstrap code based on the determined application environment to permit navigation to the target application; and transmitting the bootstrap code to the client application for transmission to the content-type-capable delegate.

2. The method of claim 1, wherein the transmitted data and callable entities comprise at least text, content type, and source fields and the transmitted data and callable entities are used to form hypermedia links.

3. The method of claim 2, further comprising delegating handling of a selected hypermedia link source field to the content-type-capable delegate based on an analysis of the content type field associated with the hypermedia link.

4. The method of claim 3, further comprising generating a request for bootstrap code by executing the source field.

5. The method of claim 4, further comprising, with the content-type-capable delegate:
receiving the transmitted bootstrap code; and
executing the transmitted bootstrap code.

6. The method of claim 5, further comprising detecting an application environment for the content-type-capable delegate.

7. The method of claim 6, further comprising executing a navigation call to a target application based upon the detected application environment.

8. The method of claim 7, wherein the target application is launched from the content-type-capable delegate.

9. A non-transitory, computer-readable medium storing computer-readable instructions executable by a computer and operable to:
receive a request from a client application for data and callable entities related to entity data viewed in the client application, the callable entities capable of displaying the data, the data in addition to the entity data viewed in the client application, and the request including a provided entity context;
transmit the data and callable entities to the client application;
receive a request for bootstrap code associated with a target application, the request for bootstrap code received from a content-type-capable delegate assigned by the client application following at least a selection in the client application of a hypermedia link associated with the target application and formed from the transmitted data and callable entities, client application analysis of a component type of the selected hypermedia link, and the content-type-capable delegate executing a uniform resource locator associated with the selected hypermedia link;
generate bootstrap code containing an application environment runtime detection library and application environment navigation data, where the generated bootstrap code, when executed by the content-type-capable delegate analyzes the content-type-capable delegate's application environment and selects a provided call in the bootstrap code based on the determined application environment to permit navigation to the target application; and
transmit the bootstrap code to the client application for transmission to the content-type-capable delegate.

10. The medium of claim 9, wherein the transmitted data and callable entities comprise at least text, content type, and source fields and the transmitted data and callable entities are used to form hypermedia links.

11. The medium of claim 10, further operable to delegate handling of a selected hypermedia link source field to the content-type-capable delegate based on an analysis of the content type field associated with the hypermedia link.

12. The medium of claim 11, further operable to generate a request for bootstrap code by executing the source field.

13. The medium of claim 12, further operable to, with the content-type-capable delegate:
receive the transmitted bootstrap code; and
execute the transmitted bootstrap code.

14. The medium of claim 13, further operable to detect an application environment for the content-type-capable delegate.

15. The method of claim 14, further operable to execute a navigation call to a target application based upon the detected application environment.

16. The medium of claim 15, wherein the target application is launched from the content-type-capable delegate.

17. A computer-implemented system comprising:
a memory configured to hold data and callable entities;
a processor interoperably coupled with the memory and configured to perform operations to:
receive a request from a client application for the data and callable entities related to entity data viewed in the client application, the callable entities capable of displaying the data, the data in addition to the entity data viewed in the client application, and the request including a provided entity context;
transmit the data and callable entities to the client application;
receive a request for bootstrap code associated with a target application, the request for bootstrap code received from a content-type-capable delegate assigned by the client application following at least a selection in the client application of a hypermedia link associated with the target application and formed from the transmitted data and callable entities, client application analysis of a component type of the selected hypermedia link, and the content-type-capable delegate executing a uniform resource locator associated with the selected hypermedia link;
generate bootstrap code containing an application environment runtime detection library and application environment navigation data, where the generated bootstrap code, when executed by the content-type-capable delegate analyzes the content-type-capable delegate's application environment and selects a provided call in the bootstrap code based on the determined application environment to permit navigation to the target application; and
transmit the bootstrap code to the client application for transmission to the content-type-capable delegate.

18. The system of claim 17, wherein the transmitted data and callable entities comprise at least text, content type, and source fields and the transmitted data and callable entities are used to form hypermedia links.

19. The system of claim 18, further configured to delegate handling of a selected hypermedia link source field to the content-type-capable delegate based on an analysis of the content type field associated with the hypermedia link.

20. The system of claim 19, further configured to generate a request for bootstrap code by executing the source field.

21. The system of claim 20, further configured to, with the content-type-capable delegate:
   receive the transmitted bootstrap code; and
   execute the transmitted bootstrap code.

22. The system of claim 21, further configured to detect an application environment for the content-type-capable delegate.

23. The system of claim 22, further configured to execute a navigation call to a target application based upon the detected application environment.

24. The system of claim 23, wherein the target application is launched from the content-type-capable delegate.

* * * * *